United States Patent

Gawlick

Patent Number: 5,233,835
Date of Patent: Aug. 10, 1993

[54] TWO-STAGE VALVE

[75] Inventor: Dieter Gawlick, Ludwigshafen, Fed. Rep. of Germany

[73] Assignee: Deere & Company, Moline, Ill.

[21] Appl. No.: 945,569

[22] Filed: Sep. 16, 1992

[30] Foreign Application Priority Data

Sep. 17, 1991 [DE] Fed. Rep. of Germany ........ 4130832

[51] Int. Cl.$^5$ .............................................. B60T 11/08
[52] U.S. Cl. ........................................ 60/578; 60/581; 60/588
[58] Field of Search ............... 60/468, 574, 578, 581, 60/588; 303/DIG. 1, DIG. 2, 9.62, 9.69, 9.75, 84.1, 84.2; 566/566

[56] References Cited

U.S. PATENT DOCUMENTS

| 4,072,012 | 2/1978 | Kawakami | 60/588 XR |
| 4,455,831 | 6/1984 | Maehara | 60/574 |
| 4,732,001 | 3/1988 | Belart | 60/578 XR |
| 4,738,109 | 4/1988 | Miller et al. | 60/578 |
| 4,963,692 | 10/1990 | Halabiya | |

FOREIGN PATENT DOCUMENTS 130297 9/1985 European Pat. Off. .
1680211 4/1971 Fed. Rep. of Germany .

Primary Examiner—Edward K. Look
Assistant Examiner—Todd Mattingly

[57] ABSTRACT

A two-stage brake valve includes a stepped valve bore and pressure piston defining a first stage with a large effective area and a second stage with a smaller effective area. The two stages become effective in succession so that, initially the first stage is used to fill a system and then, following a transitional phase, the second stage generates an operating pressure. A relief channel communicates the pressure chamber of the first stage with a reservoir. A relief valve closes the relief channel in response to an excess pressure generated by operation of the second stage.

5 Claims, 1 Drawing Sheet

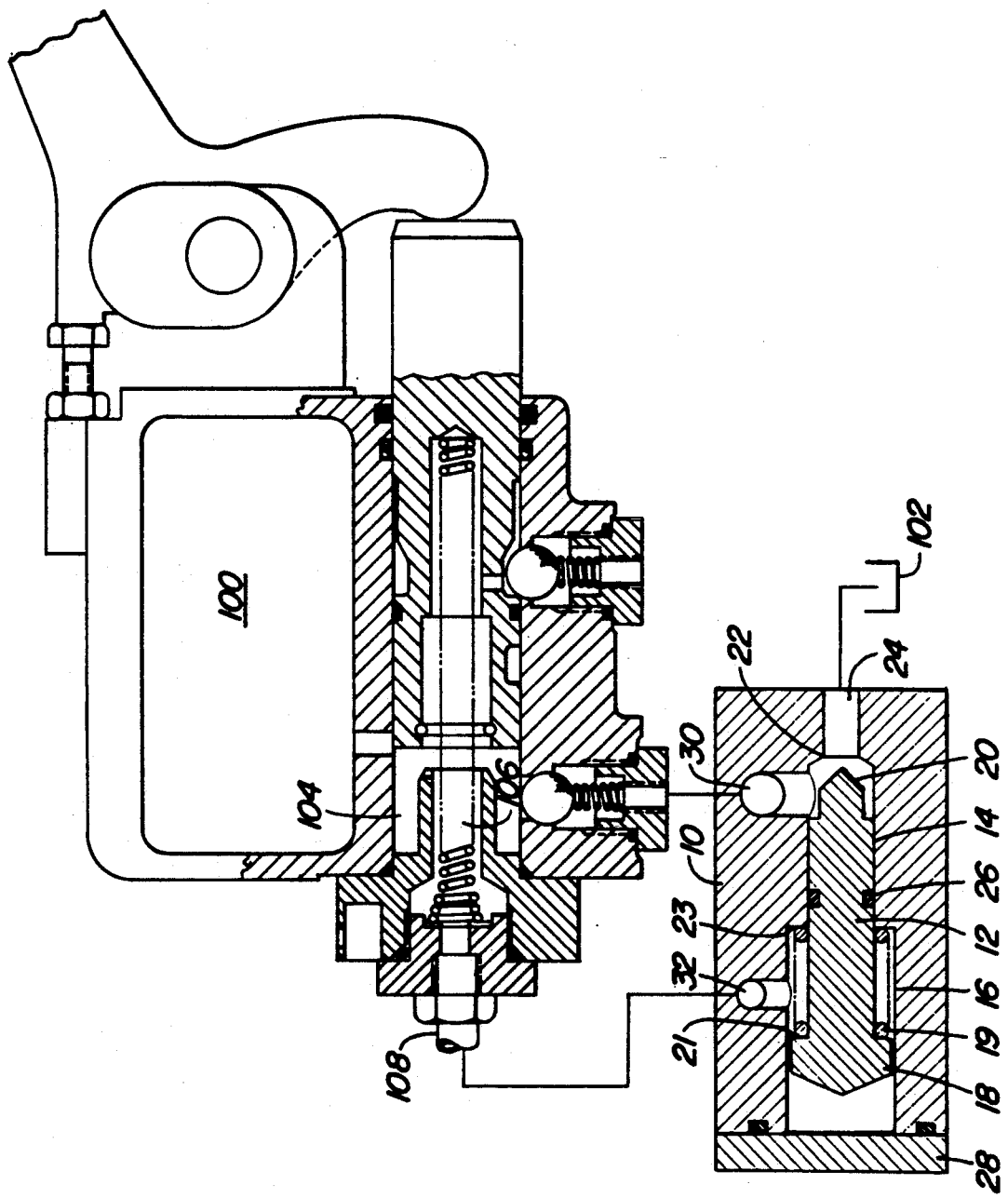

TWO-STAGE VALVE

BACKGROUND OF THE INVENTION

The invention relates to a two-stage brake valve.

A two-stage brake valve has become known from DE-A-1 680 211 in which the large effective cross section is formed by a pressure piston, which is arranged and sealed in a blind bore in the valve housing and which can be moved in the blind bore by a piston rod. The first pressure chamber corresponding to the larger effective cross section is located ahead of the end face of the pressure piston. The pressure piston contains an axial bore open to its end face, that engages a shank attached to the valve housing and that can move within the bore. A second pressure chamber is formed within the pressure piston with a smaller effective cross section. The shank is provided with a central bore through which the second pressure chamber is connected to the brake line. The first pressure chamber is connected to a reservoir through a check valve arranged in a return line (relief channel). When a pre-set pressure is exceeded in the first pressure chamber, the check valve opens. A valve arrangement is located between the first pressure chamber and the second pressure chamber, which permits an interchange of fluid between the pressure chambers and seals these against each other when a pre-set pressure is exceeded. During a first phase of movement of the pressure piston the brake chamber of the brake is filled until the pressure in the first pressure chamber rises to a point at which the check valve opens. Upon further actuation of the pressure piston the pressure in the second pressure chamber rises further and leads to closing of the valve arrangement between the pressure chambers, so that now only the smaller effective cross section of the shank is effective and a high braking pressure can be applied with relatively lower actuating force.

U.S. Pat. No. 4,963,692, issued Oct. 16, 1990 to Halabiya, describes a brake control valve that is designed similar to the one described above, in which, however, the shank does not engage the bore in the pressure piston when the pressure piston is in its rest position. Such an engagement during which the chamber is sealed occurs only after a pre-set path of movement of the pressure piston during which time the brake chamber is filled up to the point of contact of the brake linings. As soon as the shank engages the bore of the pressure piston the first pressure chamber is separated from the second pressure chamber and the smaller effective cross section becomes effective, which builds up the actual brake pressure. A valve arrangement between the two pressure chambers is not required with this brake control valve. The first pressure chamber is connected to a reservoir during the fill phase through an overpressure relief valve arranged in a relief channel, and through a direct relief channel during the pressure phase.

In these and similar two-stage valves there is the problem that with high forces acting on the pressure piston, excessively high operating pressures can be built up in the brake system or in another attached system. These pressures can lead to damage of the brake or another system.

Commonly, protection against excessive pressure can be attained by a blocking valve or a relief valve. Such a blocking valve blocks the flow of hydraulic fluid to the system after a pre-set pressure is reached. However, in brake applications this is not acceptable. For example, in brakes, at high pressures sudden leakages and other damage may not be noticed immediately. If a relief valve is used, it releases the hydraulic fluid from the system when the pre-set pressure is exceeded, until the operating pressure is reduced below the pre-set pressure. In brakes this is also unacceptable since the brake pedal would then sink to the floor.

SUMMARY OF THE INVENTION

Accordingly, an object of this invention is to provide a two-stage valve in which the aforementioned problems are avoided.

A further object of the invention is to provide such a brake valve wherein brake cylinders are protected from excessively high pressures.

Another object of the invention is to provide such a brake valve wherein the movement of the actuating lever of the pressure piston (brake pedal travel) should be limited.

These and other objects are achieved by the present invention, wherein a two-stage brake valve includes a stepped valve bore and pressure piston defining a first stage with a large effective area and a second stage with a smaller effective area. The two stages become effective in succession so that, initially the first stage is used to fill a system and then, following a transitional phase, the second stage is applied to generate the operating pressure. A relief channel extends between the pressure chamber of the first stage and a reservoir. When a pre-set operating pressure is exceeded the relief channel is closed. This channel may contain a one-way or check valve or an over-pressure relief valve so that the hydraulic fluid in the first stage can no longer escape into the reservoir, and so that the pressure in the first pressure chamber increases so as to reduce the force applied to the second stage. The pressure piston can now be moved only within the limitations of the compressibility of the hydraulic fluid.

When an overload protection valve is used in the relief channel it is actuated only when a pre-set operating pressure is exceeded. Such a pressure may, for example, be the brake pressure required to operate the emergency brake. In this pressure range the smaller effective piston cross section operates exclusively.

The hydraulic fluid in the first stage is initially conducted to the reservoir through a relief channel, if necessary after overcoming an over-pressure relief valve. It does not contribute to the piston actuating force or contributes only to a degree corresponding to the over-pressure relief valve. When the pre-set pressure of the over-pressure relief valve is reached, then the relief channel is blocked by a valve spool controlled by the operating pressure. As a result the hydraulic fluid enclosed in the first stage can no longer escape, but is compressed with increasing piston travel. This increasing hydraulic pressure adds an additional opposing force to a further movement of the piston which, for example, in a brake system must be applied by the operator by stepping on a brake pedal and thereby actuating the brake piston. The mechanical and hydraulic actuation ratios of a brake system must be designed so that after a predetermined piston travel following the closing of the over-pressure protection valve, the required pedal force becomes greater than the force the operator is able to apply. Thereby the piston comes to a stop. The operating pressure reached at this point must be in a region that is not critical for the system.

BRIEF DESCRIPTION OF THE DRAWINGS

The sole figure shows a relief channel and an overload protection valve for use in a two-stage brake valve.

DETAILED DESCRIPTION

The sole figure shows a relief or overload protection valve for use in connection with a two-stage brake valve 100. Such a two-stage brake valve is well known, for example, from U.S. Pat. No. 4,963,692, which is hereby incorporated by reference.

The relief valve has a housing 10 which contains a stepped valve bore with a narrower section 14 and a wider section 16. A valve spool 12 moves smoothly in a narrower section 14 of the valve bore. The valve spool 12 includes a head 18 at its end that extends into the wider section 16 of the valve bore. A compression spring 19 is arranged between an end face 21 of the head 18 and the opposing annular shoulder surface 23 that joins the narrower section 14 to the wider section 16, and urges the valve spool 12 in the direction of the wider section 16. A passage 24 communicates an end of the narrow bore 14 with a reservoir 102. Passage 30 communicates an end of the narrow bore 14 with chamber 104 of the first stage of brake control valve 100. Thus, passages 24 and 30 form a relief channel which extends from chamber 104 of the brake control valve 100 to reservoir 102 and intersects with an end of the narrow bore 14.

The end of the spool 12 opposite the head 18 carries a poppet member 20 that is conical in shape and opposes a seat 22 that is formed between the narrower section 14 of the valve bore and the passage 24 of the relief channel. Movement of the valve spool 12 against the force of the compression spring 19 brings the poppet member 20 into contact with the seat 22 so that communication between the valve bore 14 and the passage 24 of the relief channel is blocked.

The central region of the valve spool 12 is provided with a ring groove 26 that carries a seal ring which seals the two partial sections 14, 16 of the valve bore from each other. The wider section 16 of the valve bore is closed by a closure plate 28. This configuration simplifies the assembly of the overload protection valve.

The narrower section 14 of the valve bore is connected to chamber 104 of the brake control valve 100 through passage 30 of the relief channel. The passages 30, 24 of the relief channel may be components of a return bore as described, for example, in U.S. Pat. No. 4,963,692, so that the overload protection valve is integrated into this return bore. The overload protection valve described here may be arranged in line with a one-way check valve or an over-pressure relief valve in the return bore.

A channel 32 communicates the operating pressure from chamber 106 of the second stage of the brake control valve 100 to the bore 16. The channel 32 may be connected, for example, to the brake line 108 that leads from chamber 106 to the brakes (not shown).

The spring force of the compression spring 19 is designed so that the poppet member 20 is lifted off its seat 22 and a free flow is possible from the passage 30 into the passage 24 of the relief channel. Only when the operating pressure in the channel 32 and thereby also in the wider section 16 of the valve bore increases above a pre-set value, the valve spool 12 is moved against the force of the spring 19 and the poppet member 20 is brought into contact with the seat 22. The relief channel is now closed so that no hydraulic fluid can escape from the chamber 102 of the brake control valve 100.

While the present invention has been described in conjunction with a specific embodiment, it is understood that many alternatives, modifications and variations will be apparent to those skilled in the art in light of the foregoing embrace all such alternatives, modifications and variations which fall within the spirit and scope of the appended claims.

I claim:

1. A two-stage brake valve having a stepped valve bore and pressure piston defining a first stage with a large effective area and a second stage with a smaller effective area, the first and second stages becoming effective in succession, the first stage being used to initially to fill a stage generating an operating pressure, the brake valve having relief channel communicating a pressure chamber of the first stage with a reservoir, characterized by:

means for closing the relief channel when the operating pressure exceeds a pre-set pressure.

2. The brake valve of claim 1, wherein:

an overload protection valve exposed to the operating pressure is mounted in the relief channel.

3. The brake valve of claim 2, wherein the overload protection valve comprises:

a valve spool with an operating surface exposed to the operating pressure;

a valve seat formed in the relief channel, the valve spool being engageable with the valve seat to close the relief channel; and a spring biased to move the valve spool away from the valve seat, the operating pressure moving the valve spool towards the valve seat against the force of the spring to close the relief channel when the operating pressure exceeds a pre-set pressure.

4. The brake valve of claim 3, wherein:

the valve spool comprises a poppet member which is engageable with the seat.

5. The brake valve of claim 1, wherein:

a valve seat is formed in the relief channel;

a valve spool comprises a poppet member engageable with the seat to close the relief channel; and a spring is coupled to the valve spool and is biased to urge the poppet member away from the seat in order to keep the relief channel open, the valve spool being exposed to operating pressure on a side opposite the poppet member so that the operating pressure will move the valve spool and poppet member towards the valve seat.

* * * * *

UNITED STATES PATENT AND TRADEMARK OFFICE
CERTIFICATE OF CORRECTION

PATENT NO. : 5,233,835
DATED : 10 August 1993
INVENTOR(S) : Dieter Gawlick

It is certified that error appears in the above-indentified patent and that said Letters Patent is hereby corrected as shown below:

In Col. 4, line 25, after "a", insert --system and then, following a transitional phase, the second--.

In Col. 4, line 26, after "having", insert --a--.

Signed and Sealed this

Nineteenth Day of April, 1994

*Attest:*

BRUCE LEHMAN

*Attesting Officer*  *Commissioner of Patents and Trademarks*